(12) United States Patent
Su et al.

(10) Patent No.: US 9,551,898 B2
(45) Date of Patent: Jan. 24, 2017

(54) BACKLIGHT MODULE

(71) Applicant: DARWIN PRECISIONS CORPORATION, Taichung (TW)

(72) Inventors: Chih-Chieh Su, Pingtung (TW);
Chen-Yu Chiang, Taoyuan (TW);
Yung-Chi Wu, Hsinchu (TW);
Wen-Tai Shen, Taoyuan (TW)

(73) Assignee: DARWIN PRECISIONS CORPORATION, Taichung (TW)

( * ) Notice: Subject to any disclaimer, the term of this patent is extended or adjusted under 35 U.S.C. 154(b) by 68 days.

(21) Appl. No.: 14/796,308

(22) Filed: Jul. 10, 2015

(65) Prior Publication Data

US 2016/0018698 A1    Jan. 21, 2016

(30) Foreign Application Priority Data

Jul. 21, 2014  (TW) .............................. 103124932 A (51) Int. Cl.
*G02F 1/1335*    (2006.01)

(52) U.S. Cl.
CPC ... *G02F 1/133605* (2013.01); *G02F 1/133608* (2013.01); *G02F 1/133603* (2013.01); *G02F 1/133611* (2013.01)

(58) Field of Classification Search
CPC .................... G02F 1/133603; G02F 1/133605; G02F 1/133608; G02F 1/133611
See application file for complete search history.

(56) References Cited

U.S. PATENT DOCUMENTS

| 7,207,709 B2 | 4/2007 | Chuang et al. | |
|---|---|---|---|
| 7,497,592 B2 | 3/2009 | Chou | |
| 7,701,529 B2 | 4/2010 | Kogure et al. | |
| 2011/0317095 A1* | 12/2011 | Shimizu | G02F 1/133604 349/62 |
| 2012/0099050 A1* | 4/2012 | Kasai | G02F 1/133603 349/64 |

FOREIGN PATENT DOCUMENTS

| CN | 101358713 A | 2/2009 |
|---|---|---|
| CN | 102667315 A | 9/2012 |
| CN | 103807664 A | 5/2014 |
| TW | M273007 U | 8/2005 |
| TW | M282189 U | 12/2005 |
| TW | I263100 B | 10/2006 |
| TW | M300307 U | 11/2006 |
| TW | 200815863 | 4/2008 |

* cited by examiner

*Primary Examiner* — Stephen F Husar
(74) *Attorney, Agent, or Firm* — Muncy, Geissler, Olds & Lowe, P.C.

(57) ABSTRACT

A backlight module includes a back plate, light sources, protrusive pieces and a reflective sheet. The light sources are disposed on the back plate. The protrusive pieces protrude from the back plate. Each of the protrusive pieces is located between at least two adjacent light sources. The reflective sheet is disposed on the back plate and has through holes. Each of the light sources passes through a corresponding through hole. The reflective sheet further has cutting line groups. Each of the cutting line groups includes two cutting lines intersected at an intersection point. Each of the intersection points is substantially aligned with a corresponding protrusive piece. Portions of the reflective sheet adjacent to the cutting line groups are warped upwards from the back plate, and respectively resist the protrusive pieces.

14 Claims, 8 Drawing Sheets

BACKLIGHT MODULE

RELATED APPLICATIONS

This application claims priority to Taiwan Application Ser. No. 103124932, filed Jul. 21, 2014, which is herein incorporated by reference.

BACKGROUND

Technical Field

The present disclosure relates to a backlight module.

Description of Related Art

A backlight module is one of the key components of liquid crystal display (LCD) panels and functions to provide a light source with sufficient brightness and uniform distribution for enabling the LCD panel to display an image normally.

According to the positions of light sources, backlight modules can be generally divided into two types: edge lighting and bottom lighting. For the edge lighting, a light source is disposed on a side surface of the backlight module. This design can help to effectively reduce the thickness of the backlight module, and thus is mostly used in a portable LCD. For the bottom lighting, a light source is disposed below the backlight module. This design can help to provide uniform brightness. Moreover, because having a relatively larger installation space, this design may allow more light sources to be installed therein, and is suitable for use in a display requiring high brightness and a wide viewing angle.

Generally speaking, a bottom lighting backlight module is disposed with a reflective sheet. With the reflective sheet, light emitted from the light source is reflected to a LCD panel. Besides the enhancement of the overall luminous efficiency of the backlight module, the phenomenon of the un-uniform brightness due to the long distance between the light sources is improved.

Nevertheless, conventionally, the reflecting direction of the reflective sheet is mostly limited to one direction. In addition, the folding procedure consumes a lot of time and effort. If the reflective sheet needs to be folded for achieving a two-dimensional reflection effect, the procedure of folding and assembling the reflective sheet will become more complicated, and the manufacturing cost will be greatly increased.

SUMMARY

A technical aspect of the present disclosure is to provide a backlight module, in which the reflective sheet can effectively enhance the overall luminous efficiency of the backlight module, and at the same time improve the phenomenon of the uneven brightness due to the long distance between the light sources, while the manufacturing procedure of the reflective sheet is simple and of a low cost.

According to an embodiment of the present disclosure, a backlight module includes a back plate, a plurality of light sources, a plurality of protrusive pieces and a reflective sheet. The light sources are disposed on the back plate. The protrusive pieces protrude from the back plate, in which each of the protrusive pieces is located between at least two adjacent light sources. The reflective sheet is disposed on the back plate and has a plurality of through holes. Each of the light sources passes through a corresponding through hole. The reflective sheet further has a plurality of cutting line groups. Each of the cutting line groups includes two cutting lines intersected at an intersection point, in which each of the intersection points is substantially aligned with a corresponding protrusive piece. Portions of the reflective sheet adjacent to the cutting line groups are warped upwards from the back plate, and respectively resist the protrusive pieces.

In one or more embodiments of the present disclosure, the light sources are arranged in an array along a first direction and a second direction in a pattern of matrix. The cutting lines of each of the cutting line groups respectively have a first pointing direction and a second pointing direction. An angle included between the first pointing direction and the first direction is 0-10 degrees, and an angle included between the second pointing direction and the second direction is 0-10 degrees.

In one or more embodiments of the present disclosure, the cutting lines of each of the cutting line groups are substantially perpendicular to each other.

In one or more embodiments of the present disclosure, ends of the cutting lines of each of the cutting line groups are connected with each other to form a region. The backlight module further includes a first adhesive layer. The first adhesive layer is adhered between the back plate and the reflective sheet and is located outside the region.

In one or more embodiments of the present disclosure, ends of the cutting lines of each of the cutting line groups are connected with each other to form a region. The reflective sheet includes a main body and a plurality of warping portions. The main body is defined by a portion of the reflective sheet outside the region. The warping portions are defined by a portion of the reflective sheet inside the region, in which a border between each of the warping portions and the main body forms a folding line.

In one or more embodiments of the present disclosure, the backlight module further includes a plurality of second adhesive layers. Each of the second adhesive layers is disposed on the corresponding warping portion, faces the back plate, and adhered to a corresponding protrusive piece.

In one or more embodiments of the present disclosure, each of the cutting line groups is substantially in a shape of "X".

According to another embodiment of the present disclosure, a backlight module includes a back plate, a plurality of lighting modules, a plurality of protrusive pieces and a reflective sheet. The lighting modules are disposed on the back plate. Each of the lighting modules includes a plurality of light sources. The protrusive pieces protrude from the back plate, in which each of the protrusive pieces is located between at least two adjacent lighting modules. The reflective sheet is disposed on the back plate and has a plurality of through holes. Each of the light sources of the lighting modules passes through a corresponding through hole. The reflective sheet further has a plurality of cutting line groups. Each of the cutting line groups includes two first cutting lines and a second cutting line. Each of the second cutting lines is connected to a portion of each of the first cutting lines other than two ends thereof. Portions of the reflective sheet located between the first cutting lines are warped upwards from the back plate, and respectively resist the protrusive pieces.

In one or more embodiments of the present disclosure, each of the lighting modules is arranged along a first direction. The light sources of each of the lighting modules are arranged along a second direction. Each of the first cutting lines and the second cutting line of each of the cutting line groups respectively have a first pointing direction and a second pointing direction. The first direction and the first pointing direction are substantially parallel with each other, and the second direction and the second pointing direction are substantially parallel with each other.

In one or more embodiments of the present disclosure, each of the lighting modules is a cold cathode tube. Each of the cold cathode tubes is arranged along a first direction and is parallel with a second direction. Each of the first cutting lines and the second cutting line of each of the cutting line groups respectively have a first pointing direction and a second pointing direction. The first direction and the first pointing direction are substantially parallel with each other, and the second direction and the second pointing direction are substantially parallel with each other.

In one or more embodiments of the present disclosure, ends of each of the first cutting lines of each of the cutting line groups are connected with each other to form a region. The backlight module further includes a first adhesive layer. The first adhesive layer is adhered between the back plate and the reflective sheet and is located outside the region.

In one or more embodiments of the present disclosure, ends of each of the first cutting lines of each of the cutting line groups are connected with each other to form a region. The reflective sheet includes a main body and a plurality of warping portions. The main body is defined by a portion of the reflective sheet outside the region. The warping portions are defined by another portion of the reflective sheet inside the region, in which a border between each of the warping portions and the main body forms a folding line.

In one or more embodiments of the present disclosure, the backlight module further includes a plurality of second adhesive layers. Each of the second adhesive layers is disposed on a corresponding warping portion, faces the back plate, and is adhered to a corresponding protrusive piece.

In one or more embodiments of the present disclosure, each of the cutting line groups is substantially in a shape of "H".

When compared with the prior art, the embodiments of the present disclosure mentioned above have at least the following advantages:

(1) In the embodiments of the present disclosure as mentioned above, only the cutting line groups are disposed on the reflective sheet and the protrusive pieces are disposed on the back plate. Therefore, the procedure of assembly is simple and easy, and the manufacturing cost is not significantly increased.

(2) According to the distance between the light sources, a user can change the degree of warping of the warping portions of the reflective sheet by adjusting the shape and size of the protrusive pieces, so as to control the reflective brightness of the reflective sheet.

BRIEF DESCRIPTION OF THE DRAWINGS

The disclosure can be more fully understood by reading the following detailed description of the embodiments, with reference made to the accompanying drawings as follows.

DETAILED DESCRIPTION

Drawings will be used below to disclose a plurality of embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
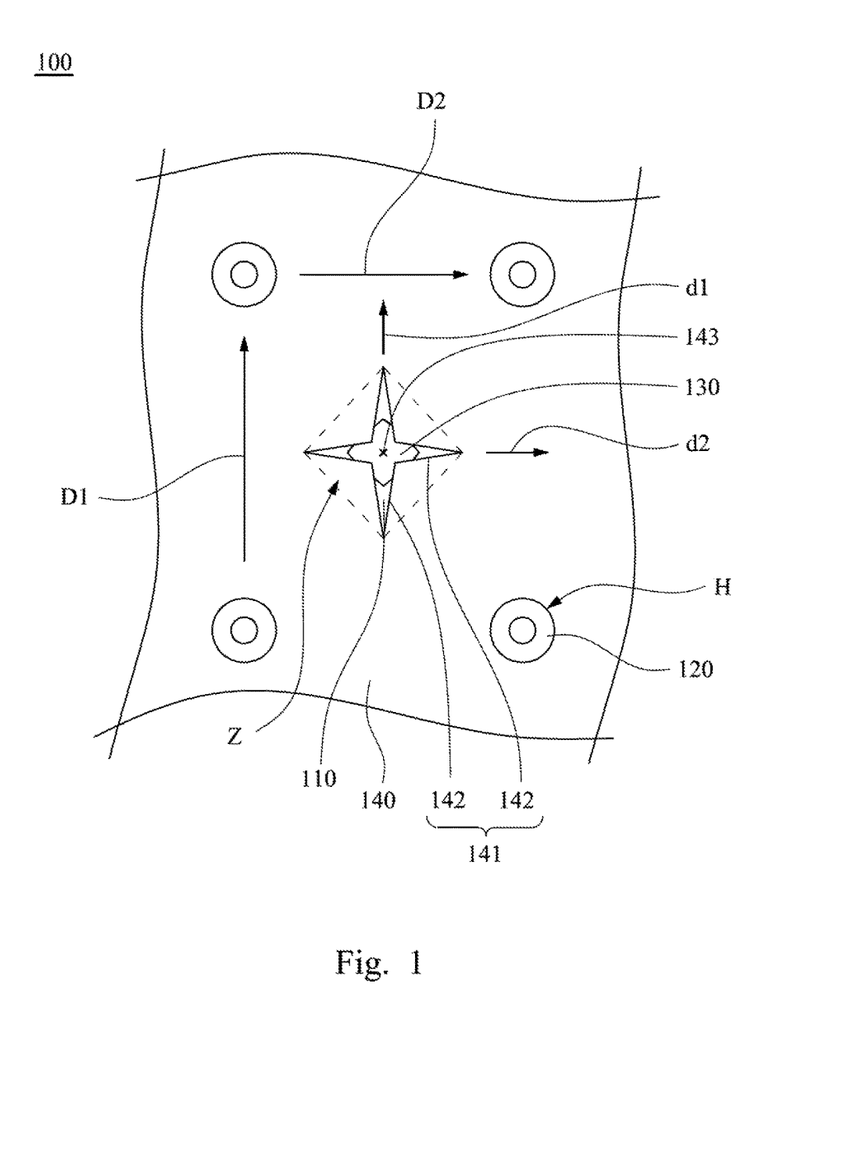
FIG. 1 is a partial top view of a backlight module according to an embodiment of the present disclosure.

Please refer to FIG. 1. FIG. 1 is a partial top view of a backlight module 100 according to an embodiment of the present disclosure. As shown in FIG. 1, the backlight module 100 includes a back plate 110, a plurality of light sources 120, a plurality of protrusive pieces 130 (only one is shown in FIG. 1) and a reflective sheet 140. The light sources 120 are disposed on the back plate 110. The protrusive pieces 130 protrude from the back plate 110, in which each of the protrusive pieces 130 is located between at least two adjacent light sources 120. It is noted that, the protrusive pieces 130 may protrude directly from the back plate 110, or may be additional plastic parts or metallic parts, the present disclosure is not limited thereto. The reflective sheet 140 is disposed on the back plate 110 and has a plurality of through holes H. Each of the light sources 120 passes through a corresponding through hole H. The reflective sheet 140 further has a plurality of cutting line groups 141. Each of the cutting line groups 141 includes two cutting lines 142 intersected at an intersection point 143, in which each of the intersection point 143 is substantially aligned with a corresponding protrusive piece 130. Portions of the reflective sheet 140 adjacent to the cutting line groups 141 are warped upwards from the back plate 110, and respectively resist the protrusive pieces 130. At this point, each of the warped portions of the reflective sheet 140 forms a curved surface.

Moreover, as shown in FIG. 1, the ends of the cutting lines 142 of each of the cutting line groups 141 are connected with each other to form a region Z. In other words, the portions of the reflective sheet 140 located inside the region Z are warped upwards from the back plate 110, and respectively resist the protrusive pieces 130.

Figure 2:
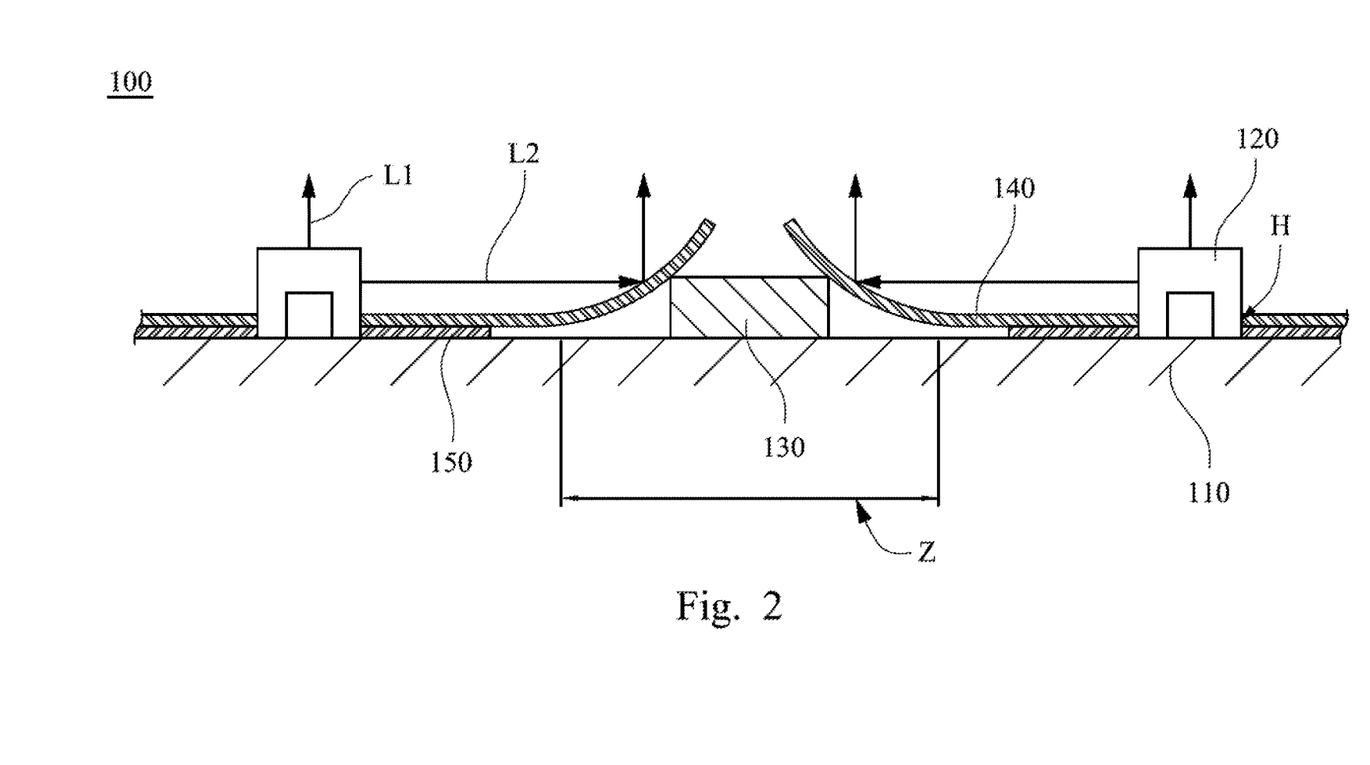
FIG. 2 is a partial cross-sectional view of the backlight module of FIG. 1.

Please refer to FIG. 2. FIG. 2 is a partial cross-sectional view of the backlight module 100 of FIG. 1. To be further illustrated, as shown in FIG. 2, when the reflective sheet 140 is installed on the back plate 110, the portions of the reflective sheet 140 located inside the region Z are pushed up (i.e., towards the upper part of FIG. 2) by the protrusive pieces 130, such that the portions of the reflective sheet 140 adjacent to the cutting line groups 141 will be warped upwards from the back plate 110. Furthermore, since the reflective sheet 140 has a certain degree of elasticity, the warped portions of the reflective sheet 140 inside the region Z tend to be restored downwards, and thus keep resisting the protrusive pieces 130. In addition, under this condition, since each of the warped portions of the reflective sheet 140 forms a curved surface, the light irradiating thereon from the light sources 120 will be evenly reflected.

More specifically speaking, when the light source 120 emits light, besides emitting a first light beam L1 towards a liquid crystal display (LCD) panel (i.e. towards the upper part of FIG. 2, in which the LCD panel not shown), the light source 120 also emits a second light beam L2 towards each of the warped portions of the reflective sheet 140. When the second light beam L2 reaches the warped portions of the reflective sheet 140, the second light beam L2 will be reflected by the warped portions of the reflective sheet 140. Consequently, the second light beam L2 will also propagate towards the LCD panel (i.e. towards the upper part of FIG. 2). As a result, for the LCD panel, the warped portions of the reflective sheet 140 act as additional light sources. In this manner, the warped portions of the reflective sheet 140 can effectively enhance the overall luminous efficiency of the backlight module 100, and at the same time improve the phenomenon of the un-uniform brightness due to the long distance between the light sources 120.

In practical applications, based on the distance between the light sources 120, a user can change the degree of warping of the warped portions of the reflective sheet 140 by adjusting the shapes and sizes of the protrusive pieces 130, so as to control the reflective brightness of the reflective sheet 140 towards the LCD panel. For example, for the light reflected by the warped portions of the reflective sheet 140 inside the region Z, its reflective brightness towards the LCD panel can be controlled to be ±3% of the brightness of the light sources 120. It is noted that the range of brightness difference described herein is merely illustrative and does not intend to limit the claimed scope. A person having ordinary skill in the art of the present disclosure should, depending on actual needs, appropriately control the range of the brightness difference between the reflective brightness of the reflective sheet 140 towards the LCD panel and the brightness of the light sources 120.

In addition, through the effect that the brightness of the reflective sheet 140 acting as additional light sources, the relative distance between the original light sources 120 can be correspondingly increased, i.e., the quantity of the original light sources 120 to be utilized can be correspondingly decreased. As a result, the cost for the backlight module 100 can also be correspondingly decreased.

Furthermore, the overall luminous efficiency of the backlight module 100 can still be increased even though the quantity of the light sources 120 is decreased. Therefore, the corresponding power consumption can be decreased, such that the overall efficiency of the LCD panel can also be increased.

Please return to FIG. 1. As shown in FIG. 1, the cutting lines 142 of the cutting line group 141 are substantially perpendicular to each other. In this manner, the adjacent parts of the reflective sheet 140 connected with the cutting lines 142 will respectively warp towards the directions perpendicular to each other. Through this simple design, the warped portions of the reflective sheet 140 can fulfill the requirements of the two-dimensional reflection parallel with the reflective sheet 140.

In this embodiment, each of the cutting line groups 141 is substantially in a shape of "X". However, this shape of the cutting line groups 141 does not intend to limit the present disclosure.

Furthermore, as shown in FIG. 1, the light sources 120 are arranged in an array along a first direction D1 and a second direction D2 in a pattern of matrix. The cutting lines 142 of each of the cutting line groups 141 respectively have a first pointing direction d1 and a second pointing direction d2. The angle included between the first pointing direction d1 and the first direction D1 is 0-10 degrees, and the angle included between the second pointing direction d2 and the second direction D2 is 0-10 degrees.

In this embodiment, the intersection point 143 of the cutting line groups 141 is located at the center of four light sources 120 arranged in a matrix. Moreover, as mentioned above, the angle included between the first pointing direction d1 and the first direction D1 is 0-10 degrees, and the angle included between the second pointing direction d2 and the second direction D2 is 0-10 degrees. As a result, each of the warped portions of the reflective sheet 140 located between the cutting lines 142 can substantially respond to one light source 120, and the warped portions of the reflective sheet 140 can evenly reflect the second light beam L2 from the light source 120 to the LCD panel.

Figure 3:
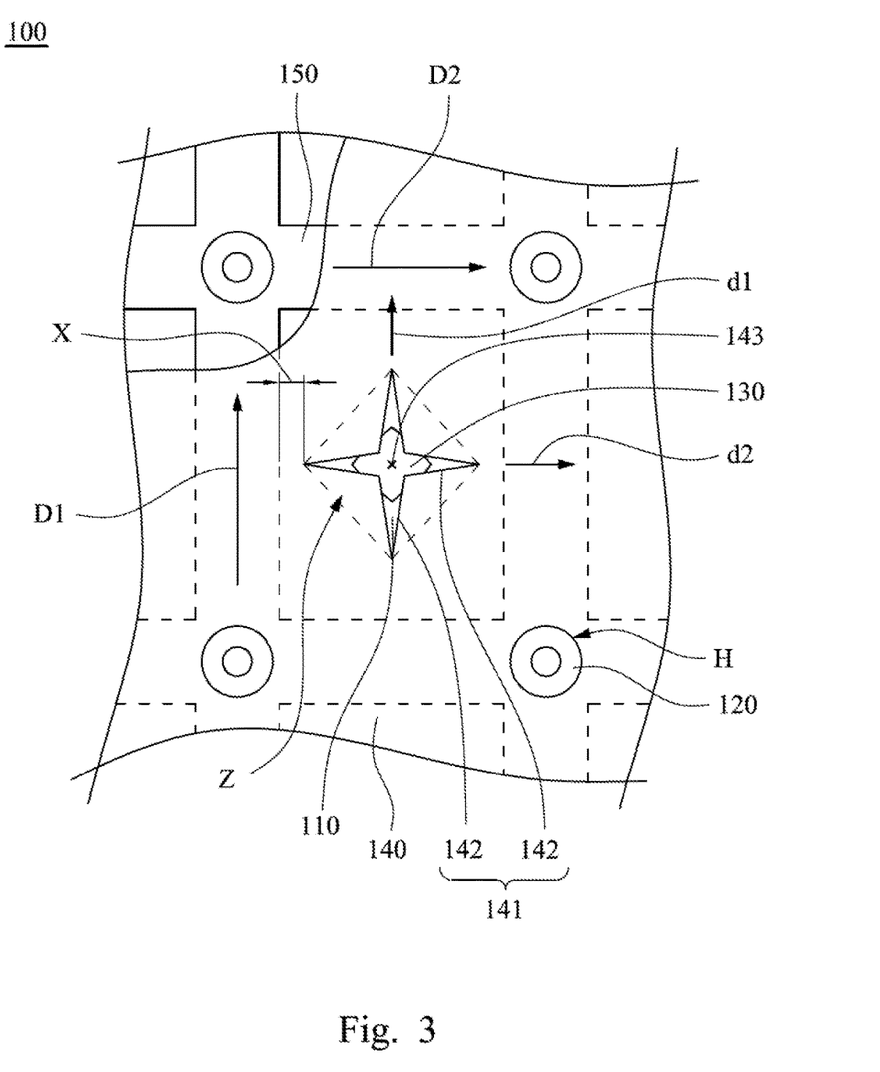
FIG. 3 is a partial cross-sectional view from the top of the backlight module of FIG. 1.

Please refer to FIG. 3. FIG. 3 is a partial cross-sectional view from the top of the backlight module 100 of FIG. 1. In order to fix the relative positions of the reflective sheet 140 and the back plate 110, the backlight module 100 further includes a first adhesive layer 150. The first adhesive layer 150 is adhered between the back plate 110 and the reflective sheet 140 and is located outside the region Z. For the considerations of the installation cost and the simplification of the assembly procedure, in this embodiment, the first adhesive layer 150 is disposed only along the first direction D1 and the second direction D2 with reference to the light sources 120. Moreover, in order to avoid that the first adhesive layer 150 affects the freedom of warping of the reflective sheet 140, a shortest distance X between the ends of the cutting lines 142 and the first adhesive layer 150 is remained. In this embodiment, the range of the shortest distance X is 10-15 mm. However, this range of the shortest distance X does not intend to limit the present disclosure.

Figure 4:
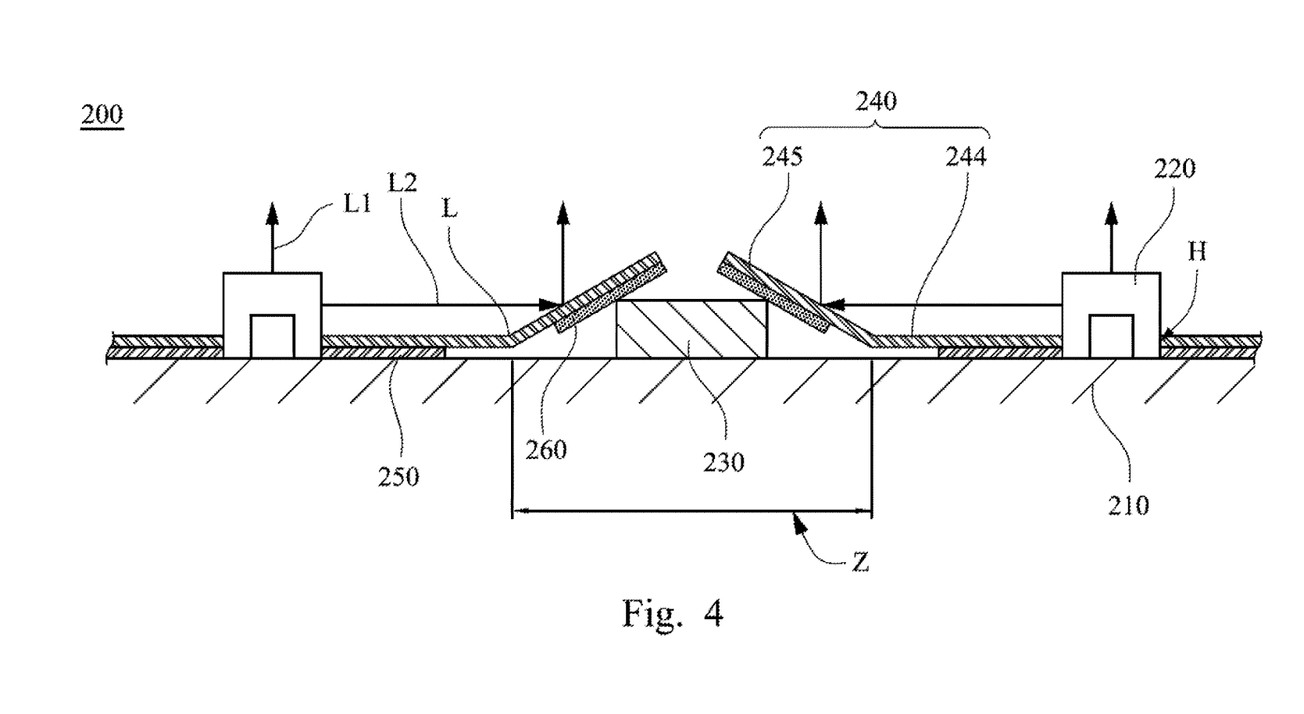
FIG. 4 is a partial cross-sectional view of a backlight module according to another embodiment of the present disclosure.

Please refer to FIG. 4. FIG. 4 is a partial cross-sectional view of a backlight module 200 according to another embodiment of the present disclosure. As shown in FIG. 4, the reflective sheet 240 includes a main body 244 and a plurality of warping portions 245. The main body 244 is defined by a portion of the reflective sheet 240 outside the region Z. In contrast, the warping portions 245 are defined by a portion of the reflective sheet 240 inside the region Z, in which a border between each of the warping portions 245 and the main body 244 forms a folding line L. In this way, the elasticity of the warping portions 245 tending to be restored towards the protrusive piece 230 is decreased.

As a result, in order to keep the warping portions 245 resisting the protrusive piece 230, i.e., to use the protrusive piece 230 to keep the warping angle of the warping portions 245, the backlight module 200 further includes a plurality of second adhesive layers 260. As shown in FIG. 4, each of the second adhesive layers 260 is disposed on a corresponding warping portion 245, faces the back plate 210, and is adhered to a corresponding protrusive piece 230. Hence, the warping portions 245 can keep resisting the protrusive piece 230, and the relative positions of the warping portions 245 and the protrusive piece 230 can be fixed.

As in FIG. 4, the configurations of the structures and the relative positions of the light sources 220 and the first adhesive layer 250 of the backlight module 200 are respectively the same as those of the light sources 120 and the first adhesive layer 150 of the backlight module 100 in the embodiment as shown in FIG. 2. Thus, they are not described again herein.

Figure 5:
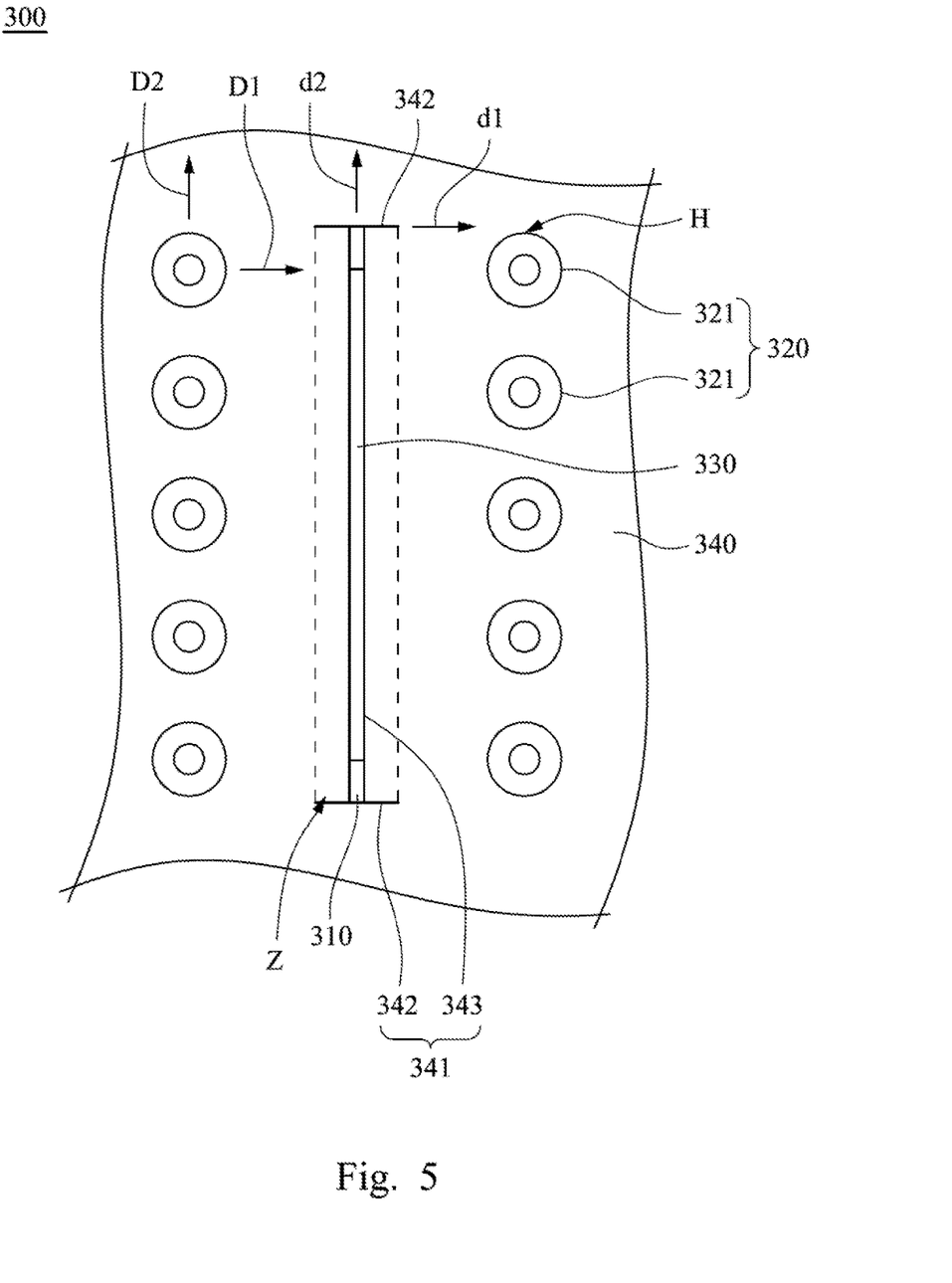
FIG. 5 is a partial top view of a backlight module according to a further embodiment of the present disclosure.

Please refer to FIG. 5. FIG. 5 is a partial top view of a backlight module 300 according to a further embodiment of the present disclosure. As shown in FIG. 5, the backlight module 300 includes a back plate 310, a plurality of lighting modules 320, a plurality of protrusive pieces 330 (only one is shown in FIG. 5) and a reflective sheet 340. The lighting modules 320 are disposed on the back plate 310. Each of the lighting modules 320 includes a plurality of light sources 321. The protrusive pieces 330 protrude from the back plate 310, in which each of the protrusive pieces 330 is located between at least two adjacent lighting modules 320. The reflective sheet 340 is disposed on the back plate 310 and has a plurality of through holes H. Each of the light sources 321 of the lighting modules 320 passes through a corresponding through hole H. The reflective sheet 340 further has a plurality of cutting line groups 341. Each of the cutting line groups 341 includes two first cutting lines 342 and a second cutting line 343. Each of the second cutting lines 343 is connected to a portion of each of the first cutting lines 342 other than two ends thereof. Portions of the reflective sheet 340 located between the first cutting lines 342 are warped upwards from the back plate 310, and respectively resist the protrusive pieces 330.

Furthermore, as shown in FIG. 5, the ends of each of the first cutting lines 342 of the cutting line groups 341 connect with each other to form a region Z. In other words, the parts of the reflective sheet 340 inside the region Z are warped upwards from the back plate 310, and respectively resist the protrusive pieces 330. At this point, each of the warped portions of the reflective sheet 340 forms a curved surface.

More specifically speaking, each of the lighting modules 320 is arranged along a first direction D1. The light sources 321 of each of the lighting modules 320 are arranged along a second direction D2. Each of the first cutting lines 342 and the second cutting line 343 of each of the cutting line groups 341 respectively have a first pointing direction d1 and a second pointing direction d2. The first direction D1 and the first pointing direction d1 are substantially parallel with each other, and the second direction D2 and the second pointing direction d2 are substantially parallel with each other. In this manner, each of the warped portions of the reflective sheet 340 corresponds to one lighting module 320.

Figure 6:
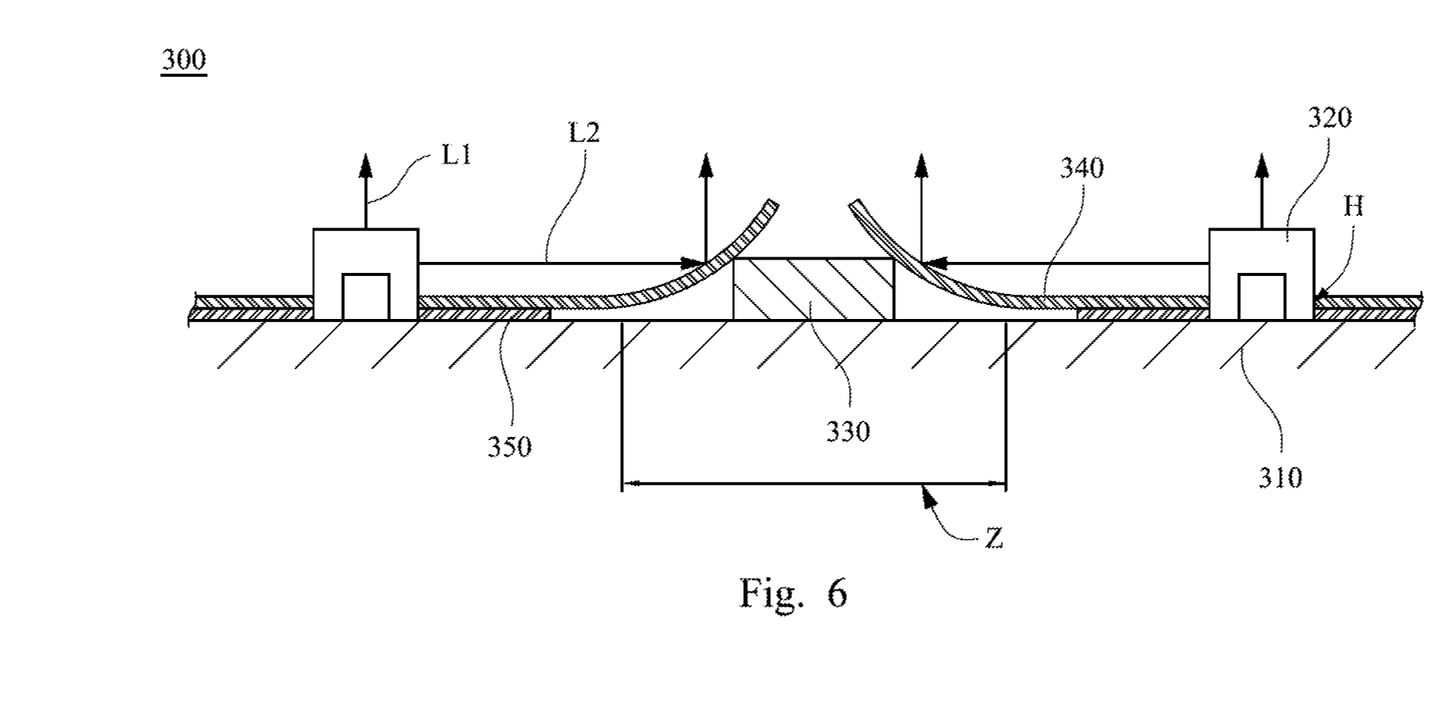
FIG. 6 is a partial cross-sectional view of the backlight module of FIG. 5.

Please refer to FIG. 6. FIG. 6 is a partial cross-sectional view of the backlight module 300 of FIG. 5. As mentioned above, when each of the warped portions of the reflective sheet 340 corresponds to one lighting module 320, as shown in FIG. 6, the warped portions of the reflective sheet 340 can effectively reflect the second light beam L2 from the lighting module 320 towards the LCD panel (i.e. towards the upper part of FIG. 6, in which the LCD panel not shown).

In this embodiment, as shown in FIG. 5, each of the cutting line groups 341 is substantially in a shape of "H". However, this shape of the cutting line groups 341 does not intend to limit the present disclosure.

Figure 7:
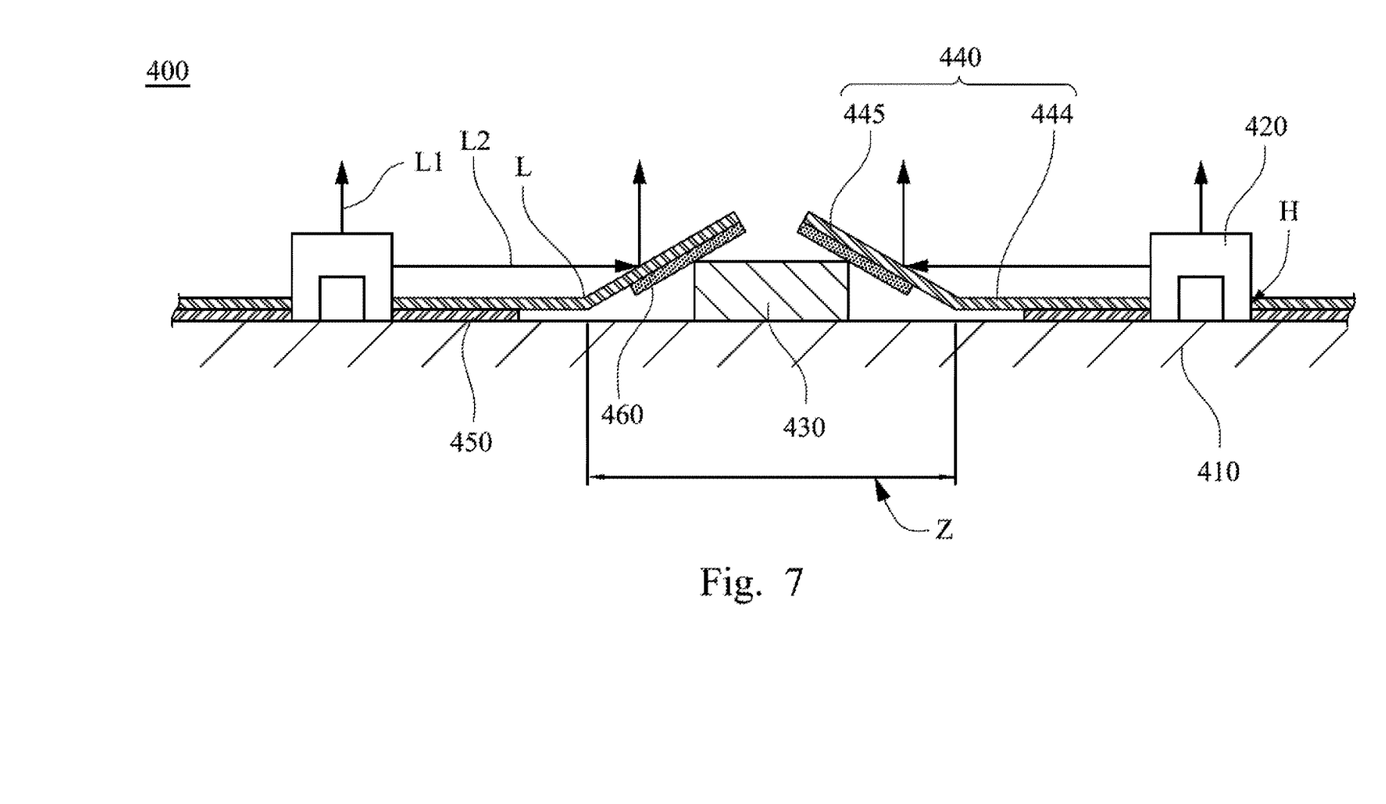
FIG. 7 is a partial cross-sectional view of a backlight module according to another embodiment of the present disclosure.

Please refer to FIG. 7. FIG. 7 is a partial cross-sectional view of a backlight module 400 according to another embodiment of the present disclosure. In this embodiment, the reflective sheet 440 includes a main body 444 and a plurality of warping portions 445. Similarly, the main body 444 is defined by a portion of the reflective sheet 440 outside the region Z. The warping portions 445 are defined by a portion of the reflective sheet 440 inside the region Z, in which a border between each of the warping portions 445 and the main body 444 forms a folding line L.

Similarly, in order to keep the warping portions 445 resisting the protrusive piece 430, i.e., to use the protrusive piece 430 to keep the warping angle of the warping portions 445, the backlight module 400 further includes a plurality of second adhesive layers 460. As shown in FIG. 7, each of the second adhesive layers 460 is disposed on a corresponding warping portion 445, faces the back plate 410, and is adhered to a corresponding protrusive piece 430. Hence, the warping portions 445 can keep resisting the protrusive piece 430, and the relative positions of the warping portions 445 and the protrusive piece 430 can be fixed.

As in FIG. 7, the configurations of the structures and the relative positions of the lighting modules 420 and the first adhesive layer 450 of the backlight module 400 are respectively the same as those of the lighting modules 320 and the first adhesive layer 350 of the backlight module 300 in the embodiment as shown in FIG. 6. Thus, they are not described again herein.

Figure 8:
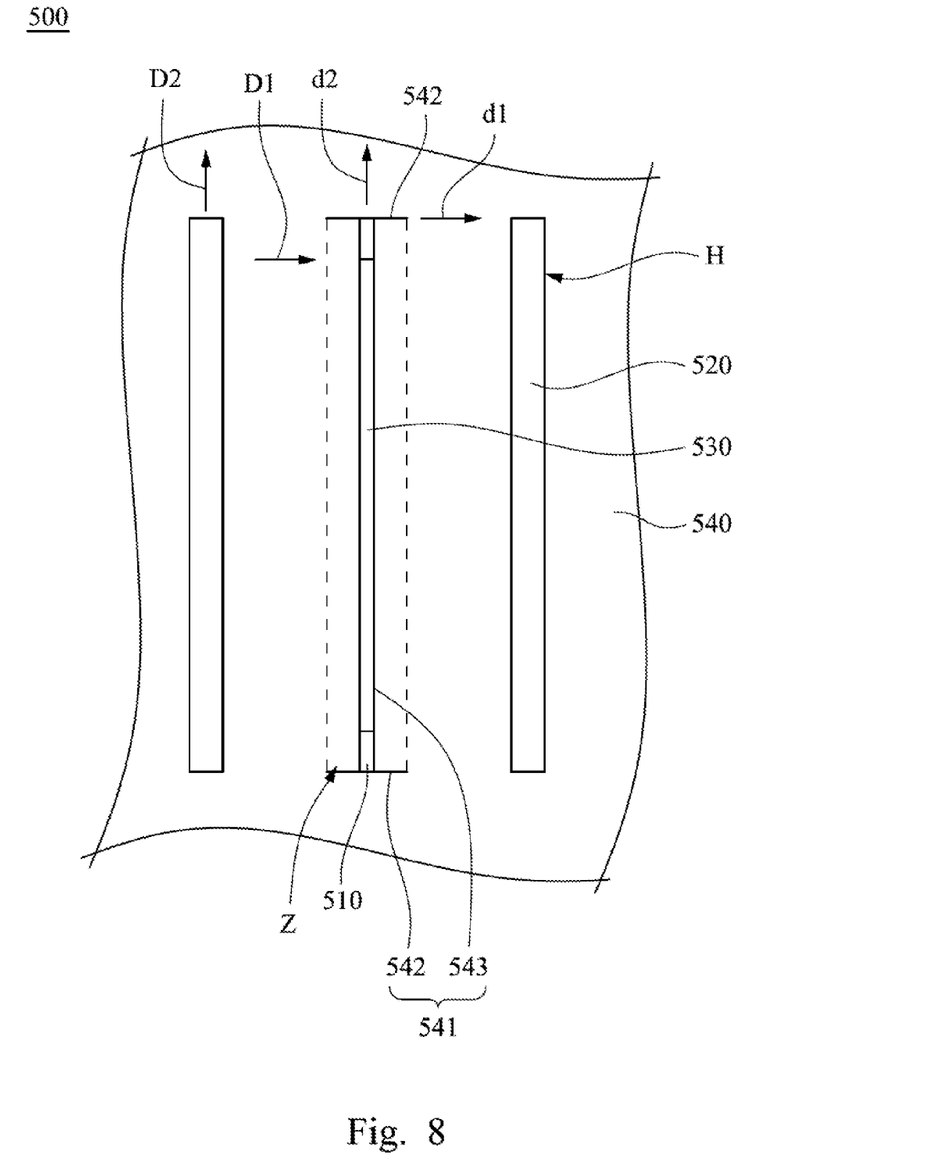
FIG. 8 is a partial top view of a backlight module according to a further embodiment of the present disclosure.

Please refer to FIG. 8. FIG. 8 is a partial top view of a backlight module 500 according to a further embodiment of the present disclosure. As shown in FIG. 8, each of the lighting modules 520 is a cold cathode tube. The cold cathode tubes are arranged along a first direction D1 and are parallel with a second direction D2. The reflective sheet 540 has the cutting line groups 541. Each of the first cutting lines 542 and the second cutting line 543 of each of the cutting line groups 541 respectively have a first pointing direction d1 and a second pointing direction d2. The first direction D1 and the first pointing direction d1 are substantially parallel with each other, and the second direction D2 and the second pointing direction d2 are substantially parallel with each other. Similarly, as the protrusive pieces 530 make the portions of the reflective sheet 540 adjacent to the cutting line groups 541 warp upwards from the back plate 510, the reflective sheet 540 can reflect the light from the cold cathode tubes. It is noted that the type of the lighting modules 520 described herein merely illustrative and does not intend to limit the claimed scope. A person having ordinary skill in the art of the present disclosure should, depending on actual needs, appropriately choose the type of the lighting modules 520.

In summary, when compared with the prior art, the embodiments of the present disclosure mentioned above have at least the following advantages:

(1) In the embodiments of the present disclosure as mentioned above, only the cutting line groups are disposed on the reflective sheet and the protrusive pieces are disposed on the back plate. Therefore, the procedure of assembly is simple and easy, and the manufacturing cost is not significantly increased.

(2) According to the distance between the light sources, a user can change the degree of warping of the warping portions of the reflective sheet by adjusting the shape and size of the protrusive pieces, so as to control the reflective brightness of the reflective sheet.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A backlight module, comprising:
   a back plate;
   a plurality of light sources disposed on the back plate;
   a plurality of protrusive pieces protruding from the back plate, wherein each of the protrusive pieces is located between at least two adjacent light sources; and
   a reflective sheet disposed on the back plate and having a plurality of through holes, each of the light sources passing through a corresponding through hole, the reflective sheet further having a plurality of cutting line groups, each of the cutting line groups comprising two cutting lines intersected at an intersection point, wherein each of the intersection points is substantially aligned with a corresponding protrusive piece;
   wherein portions of the reflective sheet adjacent to the cutting line groups are warped upwards from the back plate, and respectively resist the protrusive pieces.

2. The backlight module of claim 1, wherein the light sources are arranged in an array along a first direction and a second direction in a pattern of matrix, and the cutting lines of each of the cutting line groups respectively have a first pointing direction and a second pointing direction, and an angle included between the first pointing direction and the first direction is 0-10 degrees, and an angle included between the second pointing direction and the second direction is 0-10 degrees.

3. The backlight module of claim 1, wherein the cutting lines of each of the cutting line groups are substantially perpendicular to each other.

4. The backlight module of claim 1, wherein ends of the cutting lines of each of the cutting line groups are connected with each other to form a region, the backlight module further comprising:
   a first adhesive layer adhered between the back plate and the reflective sheet and is located outside the region.

5. The backlight module of claim 1, wherein ends of the cutting lines of each of the cutting line groups are connected with each other to form a region, the reflective sheet comprising:
   a main body defined by a portion of the reflective sheet outside the region; and
   a plurality of warping portions defined by a portion of the reflective sheet inside the region, wherein a border between each of the warping portions and the main body forms a folding line.

6. The backlight module of claim 5, further comprising:
   a plurality of second adhesive layers, wherein each of the second adhesive layers is disposed on the corresponding warping portion, faces the back plate, and adhered to a corresponding protrusive piece.

7. The backlight module of claim 1, wherein each of the cutting line groups is substantially in a shape of "X".

8. A backlight module, comprising:
   a back plate;
   a plurality of lighting modules disposed on the back plate, each of the lighting modules comprising a plurality of light sources;
   a plurality of protrusive pieces protruding from the back plate, wherein each of the protrusive pieces is located between at least two adjacent lighting modules; and
   a reflective sheet disposed on the back plate and having a plurality of through holes, each of the light sources of the lighting modules passing through a corresponding through hole, the reflective sheet further having a plurality of cutting line groups, each of the cutting line groups comprising:
      two first cutting lines; and
      a second cutting line connected to a portion of each of the first cutting lines other than two ends thereof,
   wherein portions of the reflective sheet located between the first cutting lines are warped upwards from the back plate, and respectively resist the protrusive pieces.

9. The backlight module of claim 8, wherein each of the lighting modules is arranged along a first direction, and the light sources of each of the lighting modules are arranged along a second direction, and each of the first cutting lines and the second cutting line of each of the cutting line groups respectively have a first pointing direction and a second pointing direction, and the first direction and the first pointing direction are substantially parallel with each other, and the second direction and the second pointing direction are substantially parallel with each other.

10. The backlight module of claim 8, wherein each of the lighting modules is a cold cathode tube, and each of the cold cathode tubes is arranged along a first direction and is parallel with a second direction, and each of the first cutting lines and the second cutting line of each of the cutting line groups respectively have a first pointing direction and a second pointing direction, and the first direction and the first pointing direction are substantially parallel with each other, and the second direction and the second pointing direction are substantially parallel with each other.

11. The backlight module of claim 8, wherein ends of each of the first cutting lines of the cutting line groups are connected with each other to form a region, the backlight module further comprising:
   a first adhesive layer adhered between the back plate and the reflective sheet and is located outside the region.

12. The backlight module of claim 8, wherein ends of each of the first cutting lines of each of the cutting line groups are connected with each other to form a region, the reflective sheet comprising:
   a main body defined by a portion of the reflective sheet outside the region; and
   a plurality of warping portions defined by another portion of the reflective sheet inside the region, wherein a border between each of the warping portions and the main body forms a folding line.

13. The backlight module of claim 12, further comprising:
   a plurality of second adhesive layers, wherein each of the second adhesive layers is disposed on the corresponding warping portion, faces the back plate, and adhered to a corresponding protrusive piece.

14. The backlight module of claim 8, wherein each of the cutting line groups is substantially in a shape of "H".

* * * * *